US012792360B2

(12) United States Patent
Chen et al.

(10) Patent No.: US 12,792,360 B2
(45) Date of Patent: Nov. 10, 2026

(54) SYSTEMS AND METHODS FOR CONFIGURING AN OPERATING SYSTEM

(71) Applicant: Red Hat, Inc., Raleigh, NC (US)

(72) Inventors: Huamin Chen, Westford, MA (US); Tatsuhiro Chiba, Toshima-ku (JP); Marcelo Amaral, Tokyo (JP); Scott Ross Trent, Yokahama (JP); Tamar Eilam, New York, NY (US); Rina Inoue, Tokyo (JP); Eun Kyung Lee, Bedford Corners, NY (US); Sunyanan Choochotkaew, Tokyo (JP); Sunil Thaha, Brisbane (AU)

(73) Assignee: Red Hat, Inc., Raleigh, NC (US)

( * ) Notice: Subject to any disclaimer, the term of this patent is extended or adjusted under 35 U.S.C. 154(b) by 168 days.

(21) Appl. No.: 18/935,160

(22) Filed: Nov. 1, 2024

(65) Prior Publication Data

US 2026/0127008 A1 May 7, 2026

(51) Int. Cl.
*G06F 9/44* (2018.01)
*G06F 9/4401* (2018.01)

(52) U.S. Cl.
CPC .................................. *G06F 9/4406* (2013.01)

(58) Field of Classification Search
CPC ................. G06F 1/32; G06F 9/44; G06F 1/12
See application file for complete search history.

(56) References Cited

U.S. PATENT DOCUMENTS

2015/0319160 A1* 11/2015 Ferguson ................ H04L 63/12 726/10
2022/0141220 A1* 5/2022 Lind .................. H04L 63/1433

* cited by examiner

*Primary Examiner* — Keshab R Pandey
(74) *Attorney, Agent, or Firm* — Womble Bond Dickinson (US) LLP

(57) ABSTRACT

Techniques for configuring the operating system (OS) of a computing device are disclosed. An example method includes receiving a plurality of machine specifications and a request for an OS configuration from a computing device. The method also includes identifying, by a processing device, a selected machine group from among a plurality of machine groups based on a comparison of the plurality of machine specifications with a set of principal machine specifications associated with each of the plurality of machine groups. The method also includes obtaining a pre-tuned OS configuration assigned to the selected machine group and sending the pre-tuned OS configuration to the computing device, wherein an operating system of the computing device is configured in accordance with the pre-tuned OS configuration.

20 Claims, 6 Drawing Sheets

SYSTEMS AND METHODS FOR CONFIGURING AN OPERATING SYSTEM

TECHNICAL FIELD

Aspects of the present disclosure relate to operating systems for computing devices, and more particularly, to techniques for selecting an operating system configuration for a computing device.

BACKGROUND

A computing device's operating system (OS) is a layer of software that manages computer hardware and software, enabling computer programs to access various resources such as data storage, networking, processing, and memory resources, among others. The configuration of the operating system can have a significant effect on the performance, security and power efficiency of a computing device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
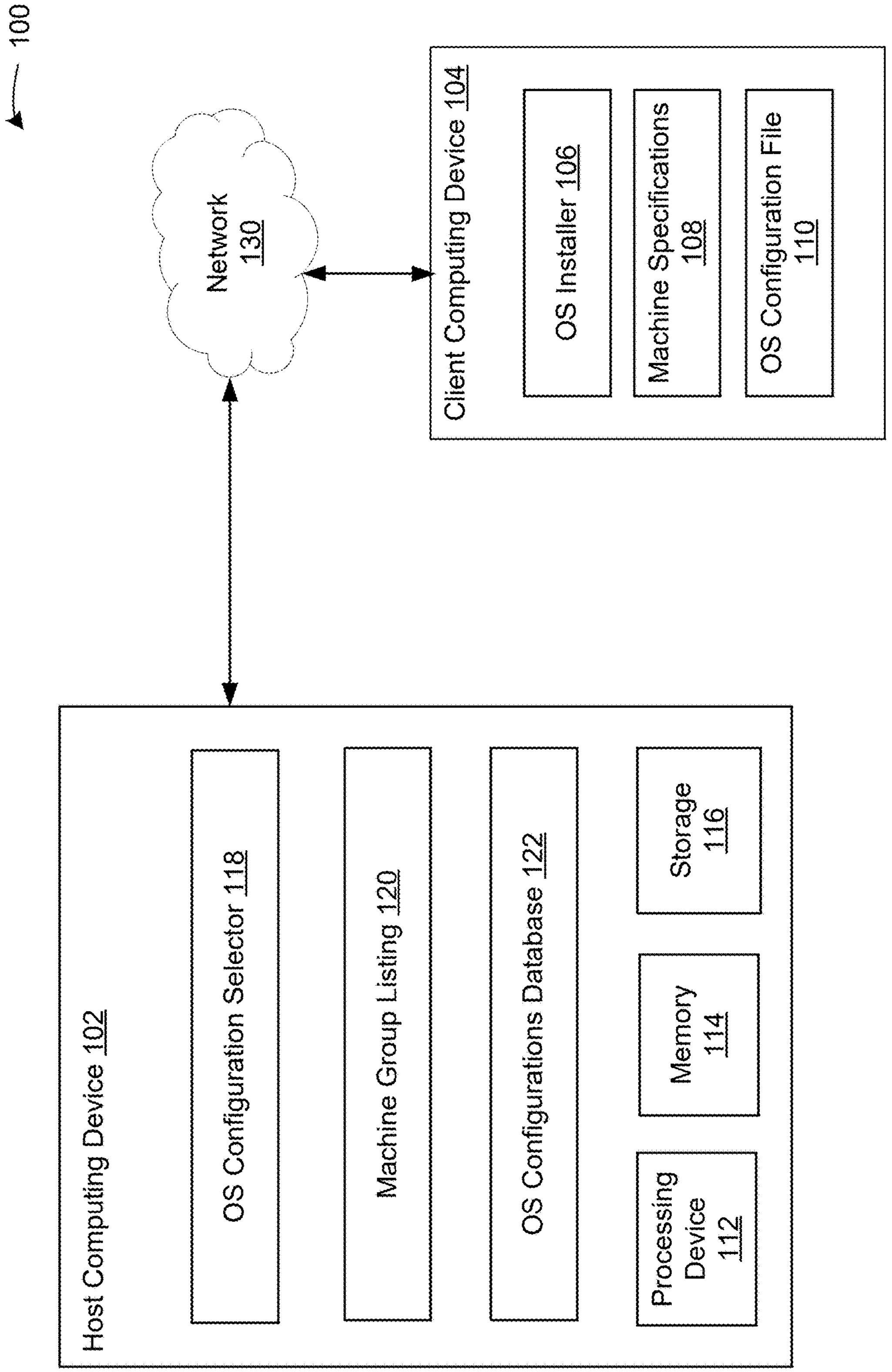
FIG. 1 is a block diagram of an example system for configuring an operating system, in accordance with some embodiments of the present disclosure.

Aspects of the present disclosure relate to techniques for configuring an operating system to improve performance and power efficiency while also maintaining a high level of security. When an operating system is installed on a computing device, the operating system may be set up using an initial configuration. For example, the installation of the operating system may be performed by an OS installer that controls the installation process by setting up basic configuration information such as disk drive partitioning, package and package group selection, location, time zone, user accounts, passwords, network configuration, and additional software and hardware configurations. In some cases, the OS installer obtains a predefined configuration file that contains all the initial configuration information, thereby eliminating the need for user interaction during the installation process.

After the initial configuration, performance of the computing system can be monitored through the collection of various types of telemetry. The telemetry can be processed to identify adjustments to the OS configuration designed to improve the computing system's performance and/or power efficiency. The OS configuration may be periodically adjusted in this manner to achieve ongoing performance improvements. Such dynamic OS tuning may be provided by an online service provider that collects telemetry remotely and periodically provides OS configuration changes. However, such dynamic OS tuning may introduce security vulnerabilities and/or system instability due to the mutable nature of the OS configuration. Additionally, allowing a remote service provider to push configuration changes over the network may present a potential point of vulnerability to outside attack.

The present disclosure provides an improved process for configuring the operating system of a computing device. Specifically, the present disclosure describes techniques for providing a customized OS configuration that is pre-tuned for the specific computing device. Embodiments of the present techniques use a group-based selection technique that enables pre-defined OS configurations to be applied to a target computing device based on the target's specifications (e.g., hardware and software specifications, power savings policies, security policies, etc.). Each of the OS configurations may be pre-tuned.

In accordance with embodiments, computing devices are grouped into categories (referred to herein as machine groups) based on a subset of specifications that describe significant characteristics of the computing devices, including hardware specifications, power management features, and performance targets. For each machine group, an OS configuration is identified that provides a high level of performance in keeping with the specified policies and performance targets. For example, the OS configuration may be identified based on historical performance data, expert knowledge, and/or prior dynamic OS tuning. The identified OS configuration then becomes the OS configuration that will be applied to computing devices that belong to the same machine group. In this way, the initial OS configuration for a target computing device can be pre-tuned based on the hardware specifications, power management features, and performance demands for the target computing device (referred to herein as machine specifications). This may eliminate the demand for dynamic OS tuning to continue after the initial configuration of the operating system. As used herein, a "pre-tuned" OS configuration refers to an OS configuration having OS parameters that have been specified to tune the performance of a computing device with the same machine specifications as the corresponding machine group.

Additionally, the group-based selection technique described herein is flexible enough to enable a suitable OS configuration to be identified even if the target computing device has not been previously encountered. To identify a machine group for a target machine, the target machine specifications may be compared to the key specifications for each machine group. The identified machine group may be the one whose specifications are more closely related to the machine specifications of the target computing device. The OS configuration for the identified machine group can be copied to the target machine.

According to the embodiments disclosed herein, a pre-tuned OS configuration may be used to configure a computing device to achieve improved performance and power efficiency without dynamically reconfiguring the operating system over time and without collecting telemetry data. In some embodiments, after the initial pre-tuned OS configuration is applied, the OS configuration may be updated periodically in response to measured performance characteristics. However, the present techniques also enable the use of an immutable OS configuration that does not change over time in response to performance data. Implementing an immutable OS configuration reduces the risk of security vulnerabilities associated with dynamic configuration changes and increases system stability by avoiding runtime modifications.

FIG. 1 is a block diagram of an example system 100 for configuring an operating system, in accordance with some embodiments of the present disclosure. One skilled in the art will appreciate that other architectures are possible for system 100 and that the implementation of the system is not necessarily limited to the specific architecture depicted by FIG. 1.

The system 100 includes a host computing device 102 and a client computing device 104, which may be communicatively coupled to each other via a network 130. Although a single client computing device 104 is shown, it will be appreciated that most systems will have multiple client computing devices 104 able to access the host computing device through the network 130. The network 130 may be a public network (e.g., the internet), a private network (e.g., a local area network (LAN) or wide area network (WAN)), or a combination thereof. In one embodiment, the network 130 may include a wired or a wireless infrastructure, which may be provided by one or more wireless communications systems, such as a WiFi™ hotspot connected with the network 130 and/or a wireless carrier system that can be implemented using various data processing equipment, communication towers (e.g., cell towers), etc. In some embodiments, the network 130 may be an L3 network. The network 130 may carry communications (e.g., data, message, packets, frames, etc.) between the host computing device 102 and client computing devices 104.

The host computing device 102 can include one or more processing devices 112 (e.g., central processing units (CPUs), graphical processing units (GPUs), etc.), main memory 114, which may include volatile memory devices (e.g., random access memory (RAM)), non-volatile memory devices (e.g., flash memory) and/or other types of memory devices, and a storage device 116 (e.g., one or more magnetic hard disk drives, a Peripheral Component Interconnect (PCI) solid state drive, a Redundant Array of Independent Disks (RAID) system, a network attached storage (NAS) array, etc.). In certain implementations, main memory 114 may be non-uniform access (NUMA), such that memory access time depends on the memory location relative to processing device 112. The storage device 116 may be a persistent storage and may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The storage device 116 may be configured for long-term storage of data. It should be noted that although, for simplicity, a single processing device 112, main memory 114, storage device 116, are shown, other embodiments may include a plurality of processing devices, memories, and storage devices. Additionally, the computing device 102 may have additional components not shown in FIG. 1. The computing device 104 may include a similar architecture.

The computing devices 102 and 104 may be any suitable type of computing devices, including servers, desktop computers, laptop computers, network appliances (e.g., switch, router), network attached storage (NAS) devices, etc. In some embodiments, the system 100 may be a cloud-based infrastructure, for example, Service as a Service (SaaS) or Platform as a Service (PaaS), and the host computing device 102 and client computing devices 104 may be a collection of multiple servers configured as a cluster.

The client computing device 104 may include an OS installer 106 and a set of machine specifications 108. The machine specifications 108 are a comprehensive description of the computing device 104, which may include hardware specifications, software specifications, and user-defined characteristics of the client computing device such as security policies, power savings policies, performance targets, and others. The machine specifications 108 may include properties detected by the client computing device 104 and/or properties specified by the user.

The OS installer 106 is a software program that runs on the client computing device 104 to install and configure the operating system of the client computing device 104. The OS installer 106 can access an operating system package that includes the operating system files to be loaded onto the client computing device 104. During the OS installation process, the OS installer 106 copies the operating system files to the client computing device 104 and configures the operating system.

Configuring the operating system may involve setting the values of a plurality of OS parameters that control various operating characteristics of the client computing device 104. The OS parameters are often stored to an operating system registry, which serves as a hierarchical database that stores settings applicable to many hardware and software components of a computing system. For example, the OS parameters may include OS kernel parameters that are usually set in the "etc/sysctl.d" directory, hardware tuning profiles that are usually set in "/sys" directory, and application parameters for any installed applications (e.g., database applications, web server applications), which are usually set in their own application-specific directories. The OS parameters to be used to configure the operating system may be stored as an OS configuration file 110 and used by the OS installer 106 to configure the operating system.

The OS installer 106 and OS configuration file 110 may be received from the host computing device 102. In some embodiments, the host computing device 102 is configured to perform some or all of the functions of a boot server. A boot server is a networked computing device that enables computers (e.g., client computing devices 104) to boot up through a network connection rather than a local drive. Accordingly, the host computing device 102 may be configured to provide the OS installer 106, operating system files (not shown), and OS configuration file 110 to the client computing device 104 through the network 130. The OS installer 106, machine specifications 108, and OS configuration file 110 may be stored in working memory or a persistent storage device of the client computing device 104.

In some embodiments, the OS configuration file 110 may be an initial OS configuration file, which is received and applied during a process of installing the operating system. The OS installation may be performed as part of a process for booting up the computing device 104. The computing device 104 may perform a boot process upon power-up of the computing device 104 or in response to a command to reboot the computing device 104. For example, the boot process may be performed by a Basic Input/Output System (BIOS), Extensible Firmware Interface (EFI), Unified EFI (UEFI), or any other suitable type of boot system. The boot process may include a variety of sub-processes including system testing and initialization, sometimes referred to as a Power-On Self-Test (POST). During system testing an initialization, the computing device's hardware and software can be discovered. For example, the computing device 104 can determine the type and number of central processing units (CPUs), the type and amount of volatile working memory, the type of network connections, available storage devices, hardware versions, software and firmware versions (e.g., device drivers), etc. The hardware and software specifications discovered during testing and initialization may be added to the machine specifications 108.

After the testing and initialization routines are completed, the client computing device 104 can load the OS installer 106, which loads the operating system into non-volatile storage. The OS installer 106 and the operating system files may be obtained from a local storage device (e.g., optical disc drive, as USB flash drive, etc) or a remote storage device (e.g., storage device 116). In some embodiments, the OS installer 106 and the operating system files are retrieved from the host computing device 102 over the network 130.

The OS installer 106 can also retrieve an OS configuration file 110 from the host computing device 102. The OS configuration file 110 may include a variety of OS parameters used to configure the operating system of the client computing device 104 for a high degree of performance (e.g., optimal or near optimal) based on the machine specifications 108 of the client computing device 104. To select the proper OS configuration file 110, the host computing device 102 may include an OS configuration selector 118, a machine group listing 120, and an OS configurations database 122.

The OS configurations database 122 is a collection of configuration files, each of which is associated with particular machine group. The machine group listing 120 lists each identified machine group along with the particular machine specifications associated with each machine group. For example, the machine group listing 120 may be a table or database where each entry includes a machine group identifier (ID), a reference to an OS configuration file within the OS configurations database, and a plurality of machine specifications that define the machine group. The machine specifications that define the machine group may be referred to as the principal specifications.

The OS configuration selector 118 receives the machine specifications 108 from the client computing device 104 and compares the machine specifications 108 with the principal specifications of each machine group in the machine group listing 120 to determine which machine group more closely matches the client computing device 104. An example method for identifying the applicable machine group is described further in relation to FIG. 3.

Once the proper machine group is identified, the OS configuration selector 118 retrieves the OS configuration file 110 assigned to that machine group from the OS configurations database 122 and provides it to the client computing device 104. The client computing device 104 may then proceed with the OS installation process and configure the operating system in accordance with the received OS configuration file 110.

Various techniques may be used to generate the machine group listing 120 and the OS configuration database 122. In some embodiments, the operating systems of a plurality of different types of computing devices may be tuned using traditional techniques, such as through performance monitoring and/or based on expert knowledge, for example. The data associated with a particular tuned computing device may be referred to herein as a specimen. Each specimen describes a set of machine specifications and a corresponding OS configuration that includes a plurality of OS parameter settings.

The OS configurations for the collection specimens may be processed to identify common or substantially similar OS configurations among the plurality of specimens. In some embodiments, this processing may be performed using a clustering algorithm. Specimens with common or substantially similar OS configurations may be grouped into clusters, where each cluster represents a different machine group. Additionally, each specimen within a particular cluster may be referred to as a member of the corresponding machine group.

The machine specifications for each specimen in a cluster may be processed to determine which machine specifications are more strongly associated with the cluster. The machine specifications that are more strongly associated with a particular cluster may be considered more relevant for determining the OS configuration for specimens in that cluster and will receive a high relevance score. For example, given a specific cluster, if all of the specimens in that cluster have a specific CPU type, then the CPU type will be determined to be an important factor for determining the OS configuration and will receive a high relevance score. On the other hand, if specimens in that cluster have a wide variety of different types of storage devices, then the storage device type would be determined to not be an important factor for determining the OS configuration and will receive a low relevance score.

The machine specifications that are more strongly associated with a particular cluster may be used to define the machine group. In some embodiments, a relevance score may be computed for each machine specification of a machine group. The relevance score may be related (e.g., proportional) to the percentage of specimens within a cluster that have the same value for that machine specification category. The machine specifications with the highest relevance scores (e.g., a specified number of the top scoring machine specification or those machine specification with scores above a threshold) may be selected as the principal specifications that define the machine group. The principal specifications may also be ranked or weighted in accordance with their relevance scores.

In some embodiments, a certainty value may be computed for each machine group. The certainty value reflects the degree of confidence that the machine group's OS configuration will provide a high level of performance for the client computing device 104. In cases where the client computing device 104 is similar to more than one machine group, the OS configuration of the machine group with the higher certainty value may be selected for configuring the operating system of client computing device 104, as described further in relation to FIG. 3. The certainty value may be computed based on the number of members within the machine group (i.e., the number of specimens within the cluster). For example, the certainty value may be computed as the number of members within the machine group divided by the total number of members in all machine groups. In this way, machine groups with a larger number of members will have a higher certainty value compared to machine groups with a lower number of members. Computing the certainty value in this way may be useful since there may be a higher degree of confidence in an OS configuration that results from tuning a large number of computing devices compared to an OS configuration that results from tuning a relatively small number of computing devices.

The techniques described herein enable the implementation of an immutable operating system, which means that the operating system configuration does not change over time. Since the operating system is tuned from the time that it is first installed, there may be no reason to change the initial OS configuration described in the OS configuration file 110 or to conduct the type of performance monitoring sometimes associated with OS tuning. Eliminating or reducing the amount of performance monitoring conducted may reduce computational and networking overhead and may also reduce the computing device's exposure to potential network-based attacks. Additionally, if the OS configuration remains the same, the computing device 104 will tend to be less vulnerable to unexpected conflicts or other sources of instability.

Although the techniques described herein are well suited for implementing an immutable operating system, it will be appreciated that embodiments of the present techniques also include implementations in which the OS configuration may change over time. Accordingly, the OS configuration file 110 received from the host computing device 102 may be applied to reconfigure an existing operating system. For example, if the computing device 104 has an installed and configured operating system, the computing device 104 may request a new configuration file 110 from the host computing device 102 and provide the current machine specifications 108. The host computing device 102 may select the configuration file 110 based on the received machine specifications 108 as described above. Reconfiguring the operating system may be useful in situations where the machine specifications 108 have changed or the host computing device 102 has developed new OS configurations and/or new machine groups based on new performance data.

It will be appreciated that embodiments of the system 100 may include additional components not shown in FIG. 1 and that some of the components shown in FIG. 1 may be omitted or combined according to the architectural specification suitable for a particular implementation.

Figure 2:
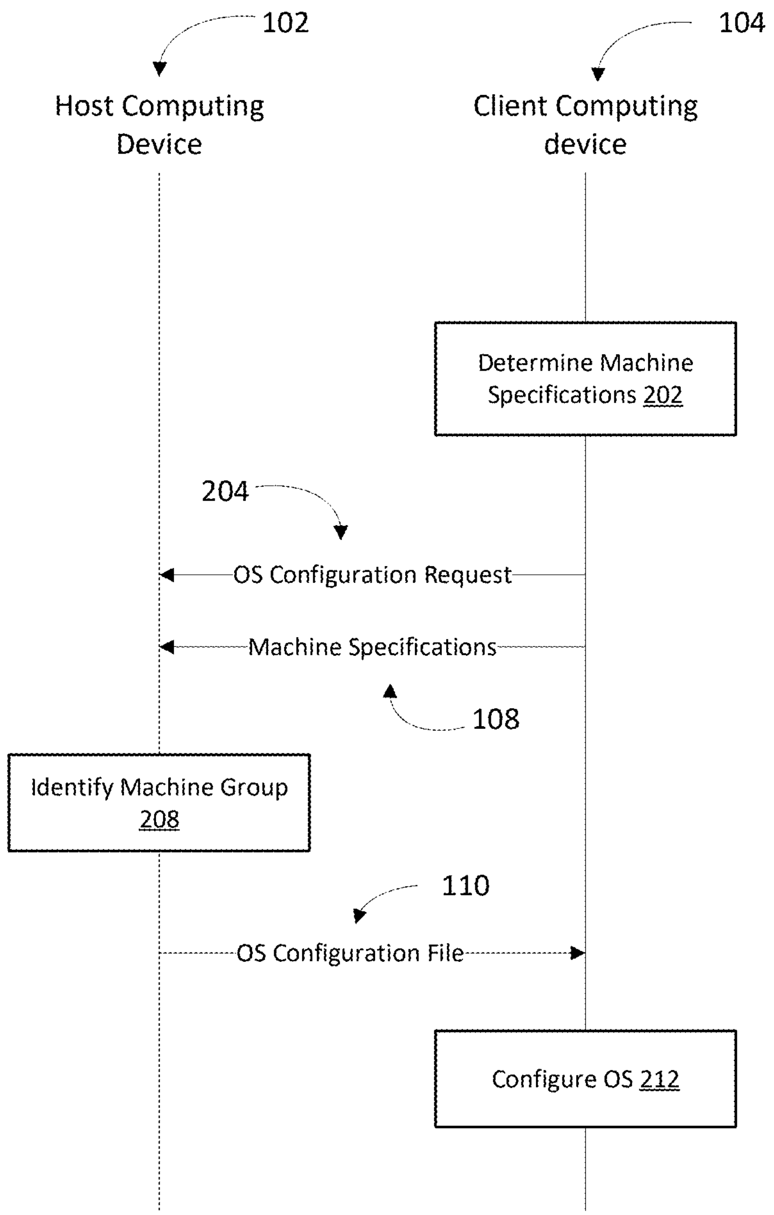
FIG. 2 is a diagram depicting an example process for configuring an operating system, in accordance with some embodiments of the present disclosure.

FIG. 2 is a diagram depicting an example process for configuring an operating system, in accordance with some embodiments of the present disclosure. The configuration process 200 may be performed to pre-tune a newly installed operating system. With reference to FIG. 1, aspects of the configuration process 200 may be performed by the host computing device 102 and/or the client computing device 104. The process may begin at block 202.

At block 202, the machine specifications of the client computing device 104 are determined. Some machine specifications may be determined by a BIOS or OS installation program as part of a process for booting the computing device. For example, some or all hardware, software, and/or firmware specifications may be determined during a power-on-self-test (POST) process. Hardware specifications may include characteristics of the CPU (e.g., vendor, model, the processing speed, number of cores, amount of cache memory, available power and/or performance states (P-states and C-states, etc.), characteristics of the working memory (e.g., type, operating frequency, amount of memory, etc.), characteristics of the storage (e.g., type, speed, storage capacity, etc.), characteristics of the networking devices (e.g., types of network adapters, link speeds, etc.), firmware versions, and others. The software specifications may indicate the type of workloads that the computing device 104 will be processing. For example, the software specifications may include the characteristics of a database application (e.g., database type, version, etc.), a Web server application, and others.

Some machine specifications, such as security policies, power savings policies, and performance targets may be specified by the user (e.g., owner, system administrator, etc.). User-specified machine specifications may be received through a user interface, which may be generated by the OS installer, BIOS, or other software or firmware. Security policies may describe conditions to be met before allowing the computing device to communicate with other devices over a network. For example, security policies may describe the types of network connections that are allowed, firewall rules to be followed, and others. In some embodiments, the security policies may include a specification of a security zone. Power saving policies may describe power efficiency targets for the computing device 104. For example, the power saving policy may describe a desired performance per watt, which is a measure of the energy efficiency that describes a computation rate that can be delivered by a computer for every watt of power consumed. Performance targets may describe a desired computing performance for the computing device. For example, the performance targets may describe a desired Instructions per second (IPS), Floating Point Operations Per Second (FLOPS), Input/Output (I/O) operations per second, operating system latency, and others.

After the machine specifications are determined, the client computing device 104 may send an OS configuration request 204 to the host computing device 102. The request for the OS configuration may be performed by the OS installer 106 (FIG. 1). The OS configuration request 204 may include or be accompanied by a set of machine specifications 108, which may include some or all of the machine specifications determined at block 202. It will be appreciated that the machine specifications 108 sent to the host computing device 102 may not include all of the specifications applicable to the client computing device 104. For example, some machine specifications may not be known. Additionally, machine specifications that are determined not to have a significant effect on determining the OS configuration (e.g., low relevance score) might not be included in the machine specifications 108 sent to the host computing device 102.

At block 208, the host computing device 102 identifies a machine group for the client computing device 104. The host computing device 102 may identify the machine group by determining which machine group among a plurality of machine groups more closely matches the machine specifications received from the client computing device 104. As described above, the identification of the machine group may be based on a reduced subset of machine specifications referred to as the principal machine specifications. The process for identifying the proper machine group may include calculating one or more metrics (e.g., similarity metrics) for each of the plurality of machine groups based on the principal machine specifications. A more detailed method for identifying the machine group is described in relation to FIG. 3. After the machine group is identified, the OS configuration assigned to that machine group can be sent to the client computing device 104 in the form of an OS configuration file 110.

At block 212, the client computing device 104 configures its operating system in accordance with the configuration information in the OS configuration file 110. Configuring the operating system may include setting various OS parameters to the configuration settings described in the OS configuration file 110. Depending on the design details of the specific operating system, the OS configuration settings may be stored, for example, in a registry file (e.g., Windows registry) or one or more configuration text files, among other possible options. In some embodiments, the process for configuring the operating system is performed by the OS installer 106 (FIG. 1) during the OS installation. The OS configuration file 110 may include OS configuration settings for a variety of OS parameters, including CPU operating frequency, C-state policies, P-state policies, CPU cache size, and others.

After the operating system configured, the client computing device 104 may be rebooted, i.e., restarted. Once the computing device 104 restarts, the computing device 104 loads the operating system into the working memory and is ready to be used for its specified purpose (e.g., processing workloads, handling network traffic, storing data, etc.).

It can be appreciated that the process 200 may include additional blocks not depicted and that some of the blocks depicted may be omitted depending on the design details of a specific embodiment.

Figure 3:
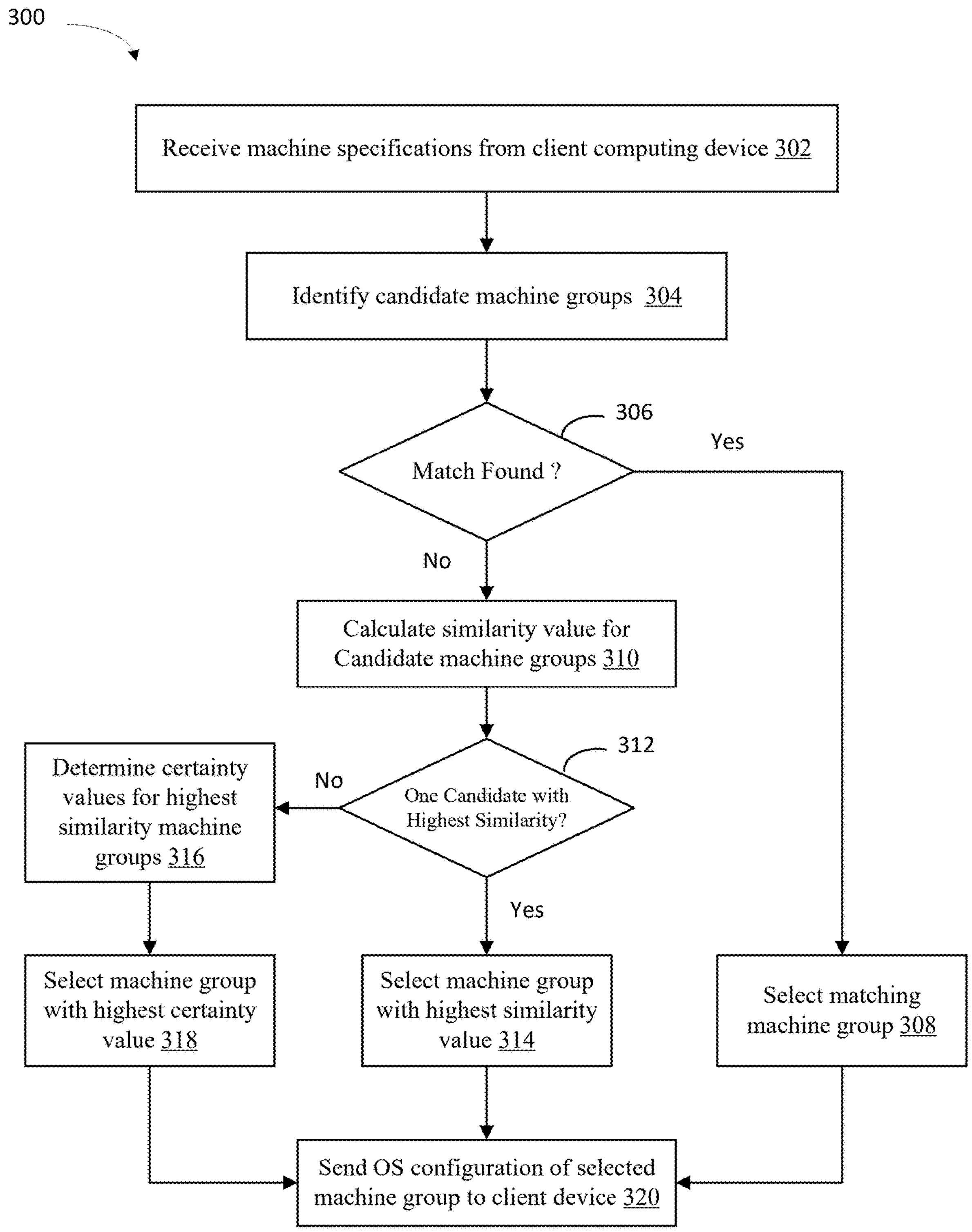
FIG. 3 is a process flow diagram depicting an example method for identifying a pre-tuned OS configuration, in accordance with some embodiments of the present disclosure.

FIG. 3 is a process flow diagram depicting an example method for identifying an OS configuration, in accordance with some embodiments of the present disclosure. With reference to FIG. 1, the method 300 may be performed by the host computing device 102 to provide configuration information to the client computing device 104. The method may begin at block 302.

At block 302, machine specifications are received from the client computing device. The machine specifications may be the machine specifications 108 shown in FIG. 1 or subset thereof. In some cases, one or more machine specifications applicable to the client computing device may be unknown. For example, a specific user-specified machine specification (e.g., power saving policy, performance target, etc.) may be left undefined.

At block 304, candidate machine groups are identified. Each machine group may include a list of principal machine specifications that are common to the computing devices in that machine group. To identify candidate machine groups, the machine specifications received at block 302 may be compared to the principal specifications of each machine group. In the embodiments shown in FIG. 3, candidate machine groups are those machine groups with principal specifications that match the known machine specifications received from the client computing device. If a machine group has a machine specification that conflicts with a known machine specification of the client computing device, the machine group is eliminated from the list of candidate machine groups. However, unknown machine specifications of the client computing device do not cause a conflict and do not exclude the machine group from being a candidate.

At block 306, a determination is made regarding whether a matching machine group was found. A machine group will be a match for the client computing device if each of the principal specifications of the machine group match with a corresponding machine specification of the client computing device. In embodiments where each machine group has a unique combination of machine specifications, only one machine group can be a match for a specific set of machine specifications. Accordingly, if a match is found, the process flow advances to block 308 and the matching machine group is selected. If a matching machine group is not found, the process flow advances to block 310.

At block 310, a similarity value is computed for each candidate machine group. The similarity value reflects the degree of overlap between the principal machine specifications of the machine group and the machine specifications of the client computing device. A higher similarity value may indicate that the machine group's OS configuration will provide a high level of performance for the client computing device. The similarity value may be computed such that each matching specification between the machine group and the machine specifications of the client computing device increases the certainty value. Additionally, the machine specifications may be weighted in the similarity value computations to reflect the degree to which each machine specification affects the tuning of the operating system. For example, the machine specifications may be weighted in accordance with their respective relevance values.

At block 312, a determination is made regarding whether one candidate has the highest similarity. If one candidate does have the highest similarity, the process flow advances to block 314 and the machine group with the highest similarity value is selected. Otherwise, if two or more candidates are tied for the highest similarity, the process flow advances to block 316.

At block 316, a certainty value is determined for each of the highest similarity machine groups. The certainty values may be computed as described in relation to FIG. 2 and stored in the machine group listing as characteristics of each machine group. Determining the certainty values may include obtaining the certainty values from storage or memory. The process flow then advances to block 318, and the machine group with the highest certainty value is selected.

Once the machine group is selected at block 308, block 314, or 318, the process flow advances to block 320, and the OS configuration of the selected machine group is sent to the client computing device. As mentioned above, the selected machine group may be associated with an OS configuration file that is well tuned for computing devices that fall within that machine group.

In some embodiments, the similarity value and certainty value may be sent to the client computing device in addition to the OS configuration file. The similarity value and certainty value may be used to determine operating features of the client computing device, such as whether the operating system is immutable or whether dynamic OS tuning may be performed to adjust the OS configuration in the future. For example, if the similarity value and/or certainty value are below a threshold, the operating system of client computing device may be retuned based on monitored operating conditions of the computing device. The similarity value and certainty value may be used to determine a performance monitoring scheme or a tuning schedule that controls future OS tuning adjustments for the computing device.

It will be appreciated that the blocks shown in FIG. 3 may be performed in a different order compared to what is shown. Additionally, embodiments of the method 300 may include additional blocks not shown in FIG. 3 and some of the blocks shown in FIG. 3 may be omitted.

Figure 4:
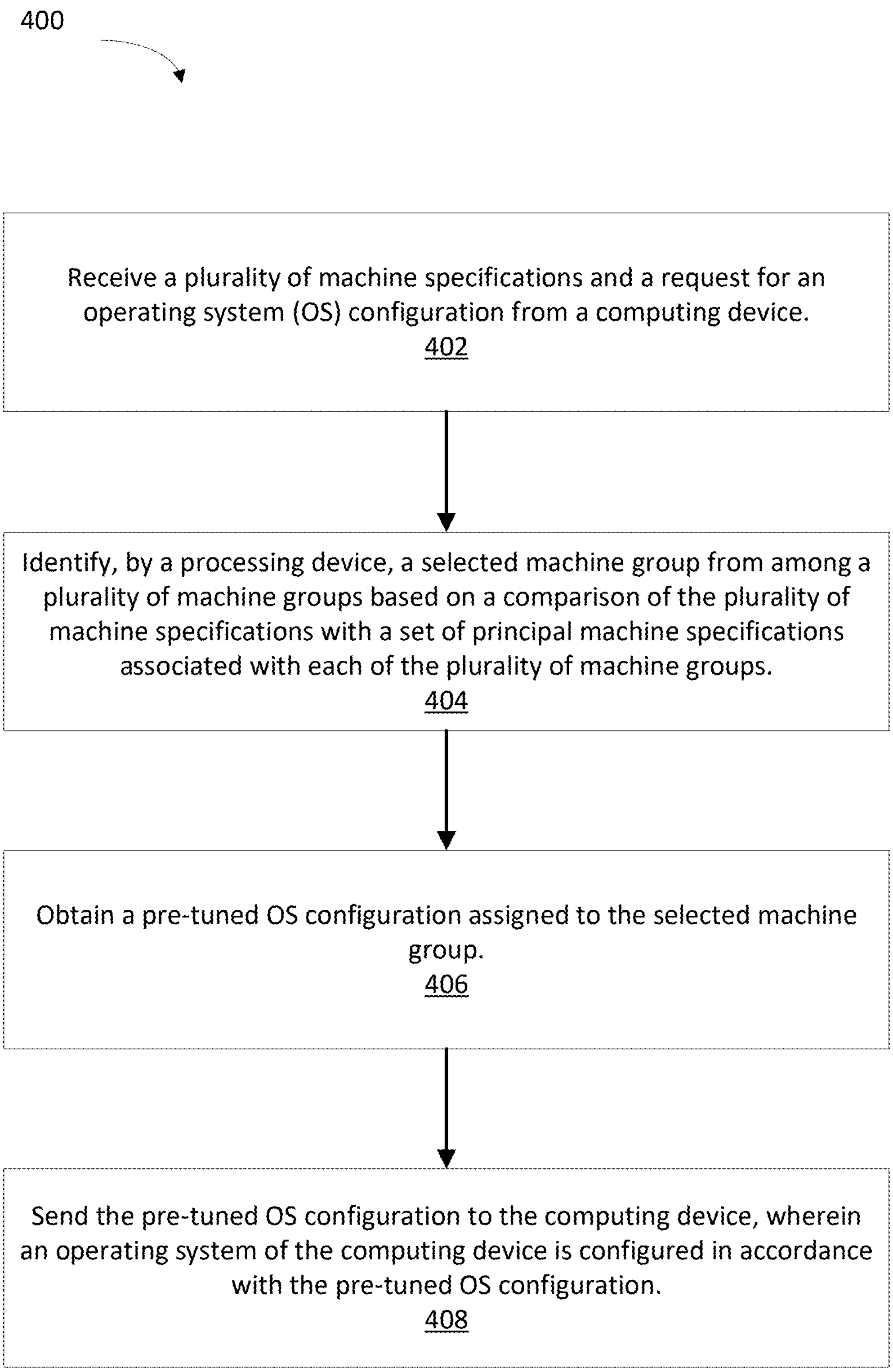
FIG. 4 is a process flow diagram summarizing a method of configuring an operating system, in accordance with some embodiments of the present disclosure.

FIG. 4 is a process flow diagram summarizing a method of configuring an operating system, in accordance with some embodiments of the present disclosure. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, aspects of the method 400 may be performed by the computing device 102 and/or the computing device 104. The method may begin at block 402.

At block 402, a plurality of machine specifications and a request for an operating system (OS) configuration is received from a computing device. In some embodiments, the request for the OS configuration is received from an OS installer of the computing device (e.g., client computing device 104 of FIG. 1) as described above. The machine specifications may include any of the hardware or software specifications of the computing device, security policies to be applied to the computing device, a power savings policy to be applied to the computing device, and a performance target to be achieved by the computing device.

At block 404, a selected machine group is identified from among a plurality of machine groups based on a comparison of the plurality of machine specifications with a set of principal machine specifications associated with each of the plurality of machine groups. Identifying the selected machine group may include computing a certainty value and/or a similarity value for at least some of the machine groups as described in relation to FIG. 1 and FIG. 3. The similarity value reflects a degree to which the principal machine specifications of the selected machine group overlap with the machine specifications of the computing device. The certainty value reflects a degree of confidence that the machine group's OS configuration will provide a high level of performance for computing devices that fall within that machine group, and may be computed based on the number of members within the machine group. For example, the certainty value may be proportional to a number of previously-tuned computing devices that are members of the selected machine group. This may include computing the certainty value as a ratio of the number of previously-tuned computing devices that are members of the selected machine group relative to a total number of previously-tuned computing devices for all of the machine groups. The certainty value may be used as a deciding factor when two or more machine groups are tied for having the highest similarity value.

At block 406, a pre-tuned OS configuration assigned to the selected machine group is obtained. For example, the pre-tuned OS configuration may be retrieved from the OS configurations database 122 shown in FIG. 1.

At block 408, the pre-tuned OS configuration is sent to the computing device. The operating system of the computing device is configured in accordance with the pre-tuned OS configuration. In some embodiments, the operating system of the computing device is immutable and is not dynamically re-tuned over time. In other embodiments, parameters of the operating system may be dynamically adjusting based on a monitored performance of the operating system after the operating system is configured in accordance with the pre-tuned OS configuration.

It will be appreciated that the blocks shown in FIG. 3 may be performed in a different order compared to what is shown. Additionally, embodiments of the method 400 may include additional blocks not shown in FIG. 4 and that some of the blocks shown in FIG. 4 may be omitted.

Figure 5:
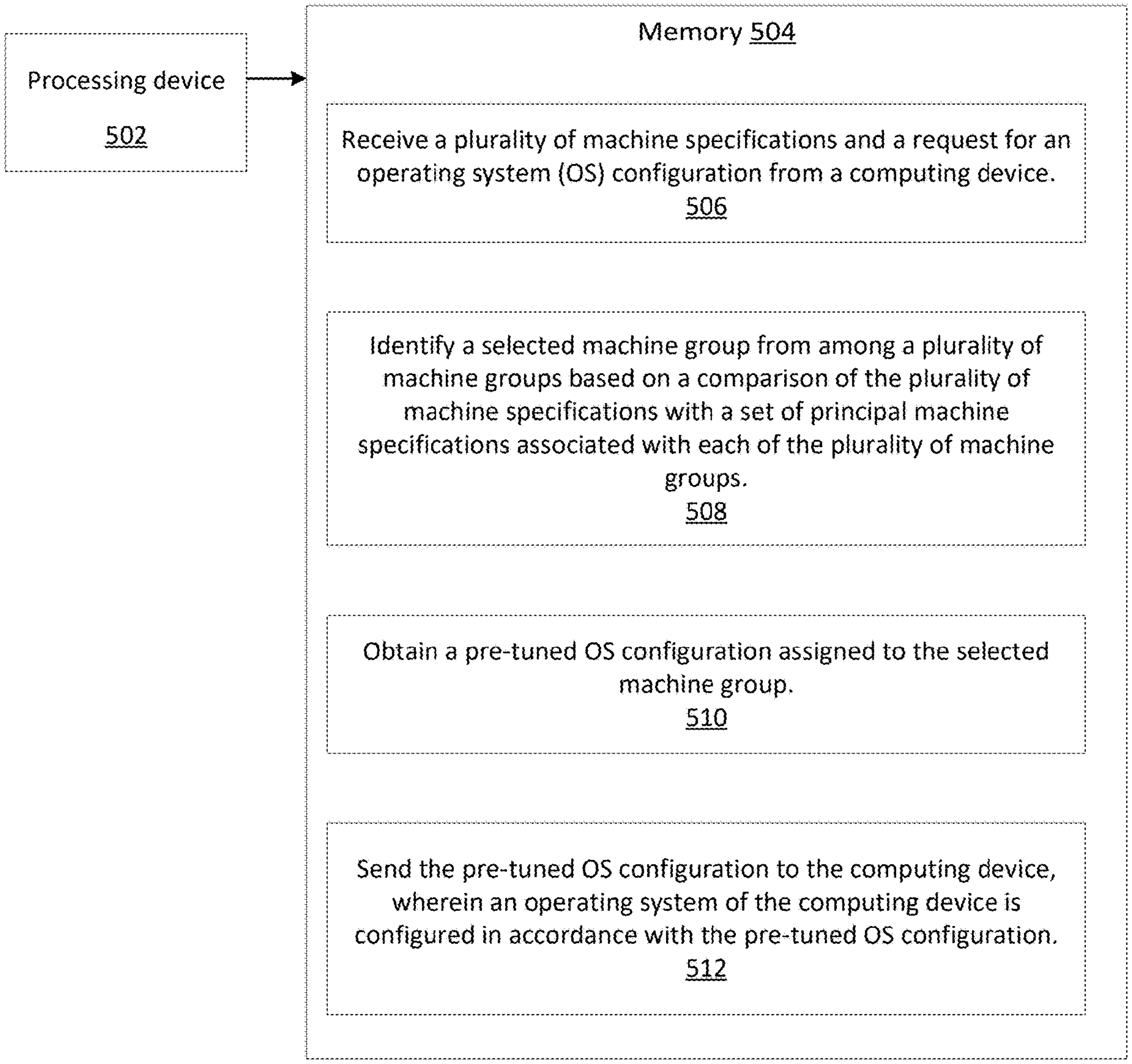
FIG. 5 is a simplified block diagram of an example system for configuring an operating system, in accordance with some embodiments of the present disclosure.

FIG. 5 is a simplified block diagram of an example system for configuring an operating system, in accordance with some embodiments of the present disclosure. The system 500 includes a processing device 502 operatively coupled to a memory 504. The memory 504 can include instructions that are executable by the processing device 502 to cause the processing device 502 to provide a pre-tuned OS configuration to a computing device.

The memory 504 includes instructions 506 to receive a plurality of machine specifications and a request for an operating system (OS) configuration from a computing device. The memory 504 also includes instructions 508 to identify a selected machine group from among a plurality of machine groups based on a comparison of the plurality of machine specifications with a set of principal machine specifications associated with each of the plurality of machine groups. The memory 504 also includes instructions 510 to obtain a pre-tuned OS configuration assigned to the selected machine group. The memory 504 also includes instructions to send the pre-tuned OS configuration to the computing device, wherein an operating system of the computing device is configured in accordance with the pre-tuned OS configuration. It will be appreciated that embodiments of the system 500 may include additional blocks not shown in FIG. 5 and that some of the blocks shown in FIG. 5 may be omitted.

Figure 6:
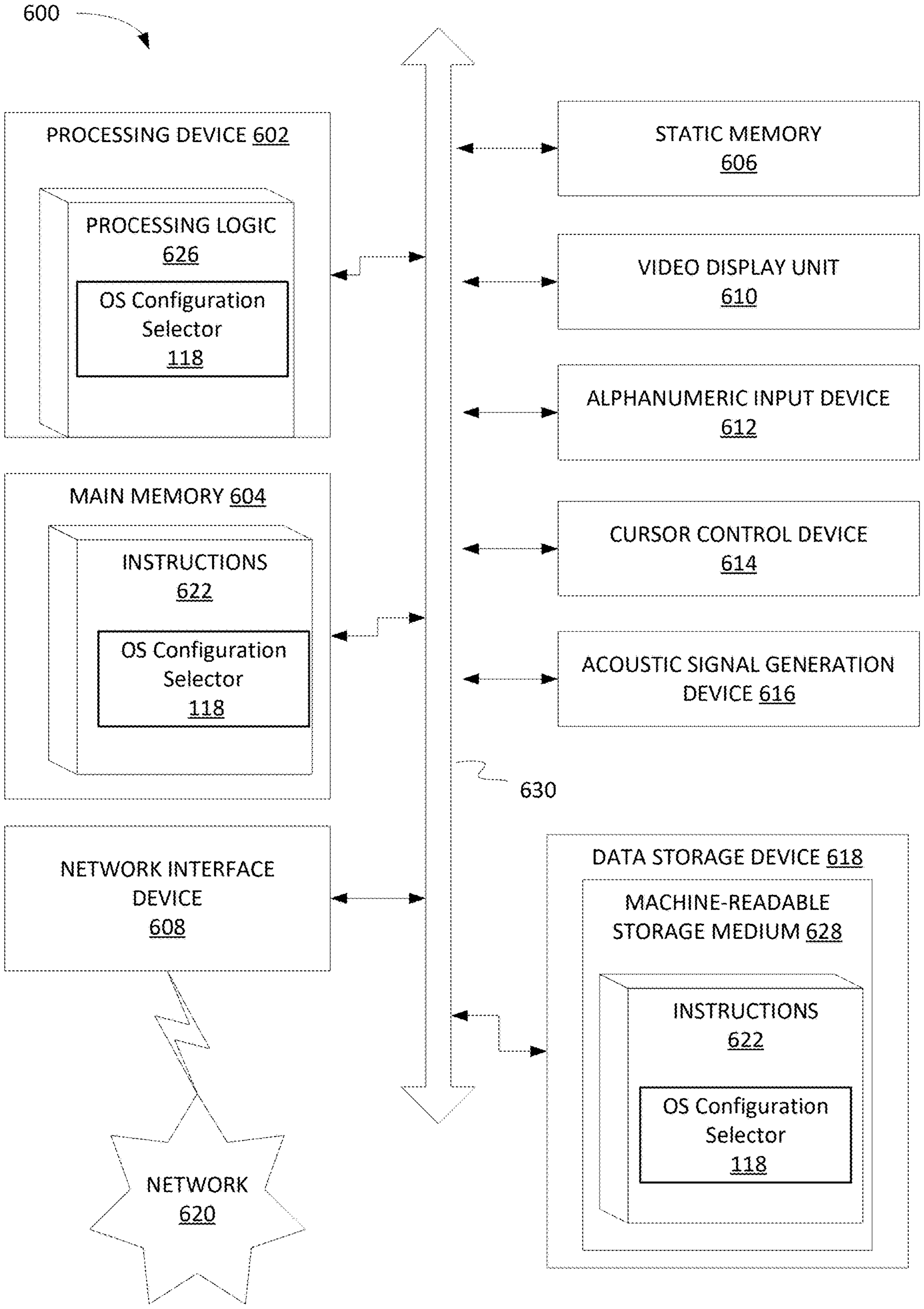
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a web appliance, a server, and other machines capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as a boot server, configured to provide a pre-tuned OS configuration to a requesting device as described above.

The example computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein. For example, the processing logic 626 may include logic for performing the functions of the host computing device 102 or client computing device 104. The processing logic 626 may include an OS configuration selector 632 configured to identify a pre-tuned OS configuration to be sent to a computing device.

The data storage device 618 may include a machine-readable storage medium 628, on which is stored one or more set of instructions 622 (e.g., software) embodying any one or more of the methodologies of functions described herein, including instructions to cause the processing device 602 to perform the functions of the OS configuration selector 118 as describe in relation to FIG. 1. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608. The data storage device 618 may also include a machine group listing 120 and an OS configurations database 122 as describe in relation to FIG. 1.

While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "identifying," "sending," "requesting," "storing," "determining," "processing," "generating," "performing," "installing," "configuring," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:

receiving a plurality of machine specifications and a request for an operating system (OS) configuration from a computing device;

identifying, by a processing device, a selected machine group from among a plurality of machine groups based on a comparison of the plurality of machine specifications with a set of principal machine specifications associated with each of the plurality of machine groups;

obtaining a pre-tuned OS configuration assigned to the selected machine group; and sending the pre-tuned OS configuration to the computing device, wherein an operating system of the computing device is configured in accordance with the pre-tuned OS configuration.

2. The method of claim 1, wherein the operating system of the computing device is immutable.

3. The method of claim 1, the method further comprising adjusting parameters of the operating system based on a monitored performance of the operating system after the operating system is configured in accordance with the pre-tuned OS configuration.

4. The method of claim 1, comprising identifying the plurality of machine groups and their respective pre-tuned OS configurations based on historical configuration data.

5. The method of claim 1, wherein the machine specifications comprise hardware specifications of the computing device, a power savings policy to be applied to the computing device, and a performance target to be achieved by the computing device.

6. The method of claim 1, wherein the pre-tuned OS configuration is an initial OS configuration and the request for the OS configuration is received from an OS installer of the computing device.

7. The method of claim 1, wherein identifying the selected machine group comprises computing a similarity value that reflects a degree to which the principal machine specifications of the selected machine group overlap with the machine specifications of the computing device.

8. The method of claim 1, wherein identifying the selected machine group comprises determining a certainty value for the selected machine group, wherein the certainty value is proportional to a number of previously-tuned computing devices that are members of the selected machine group.

9. A system comprising:

a memory; and a processing device, operatively coupled to the memory, the processing device to:

receive a plurality of machine specifications and a request for an operating system (OS) configuration from a computing device;

identify a selected machine group from among a plurality of machine groups based on a comparison of the plurality of machine specifications with a set of principal machine specifications associated with each of the plurality of machine groups;

obtain a pre-tuned OS configuration assigned to the selected machine group; and send the pre-tuned OS configuration to the computing device, wherein an operating system of the computing device is configured in accordance with the pre-tuned OS configuration.

10. The system of claim 9, wherein the operating system of the computing device is immutable.

11. The system of claim 9, wherein the processing device is further to adjust parameters of the operating system based on a monitored performance of the operating system after the operating system is configured in accordance with the pre-tuned OS configuration.

12. The system of claim 9, wherein the processing device is further to identify the plurality of machine groups and their respective pre-tuned OS configurations based on historical configuration data.

13. The system of claim 9, wherein the machine specifications comprise hardware specifications of the computing device, a power savings policy to be applied to the computing device, and a performance target to be achieved by the computing device.

14. The system of claim 9, wherein the pre-tuned OS configuration is an initial OS configuration and the request for the OS configuration is received from an OS installer of the computing device.

15. The system of claim 9, wherein to identify the selected machine group, the processing device is to compute a similarity value that reflects a degree to which the principal machine specifications of the selected machine group overlap with the machine specifications of the computing device.

16. The system of claim 9, wherein identifying the selected machine group, the processing device is to determining a certainty value for the selected machine group, wherein the certainty value is proportional to a number of previously-tuned computing devices that are members of the selected machine group.

17. A non-transitory computer-readable storage medium including instructions that, when executed by a processing device, cause the processing device to:

receive a plurality of machine specifications and a request for an operating system (OS) configuration from a computing device;

identify, by the processing device, a selected machine group from among a plurality of machine groups based on a comparison of the plurality of machine specifications with a set of principal machine specifications associated with each of the plurality of machine groups;

obtain a pre-tuned OS configuration assigned to the selected machine group; and send the pre-tuned OS configuration to the computing device, wherein an operating system of the computing device is configured in accordance with the pre-tuned OS configuration.

18. The non-transitory computer-readable storage medium of claim 17, wherein the pre-tuned OS configuration is an initial OS configuration and the request for the OS configuration is received from an OS installer of the computing device.

19. The non-transitory computer-readable storage medium of claim 17, wherein to identify the selected machine group, the instructions cause the processing device to compute a similarity value that reflects a degree to which the principal machine specifications of the selected machine group overlap with the machine specifications of the computing device.

20. The non-transitory computer-readable storage medium of claim 17, wherein identifying the selected machine group, the instructions cause the processing device to determining a certainty value for the selected machine group, wherein the certainty value is proportional to a number of previously-tuned computing devices that are members of the selected machine group.

* * * * *